Sept. 3, 1940.                T. J. DAILEY                2,213,385
            TAIL GATE OPERATING MECHANISM FOR DUMP TRUCKS
                          Filed Dec. 27, 1938
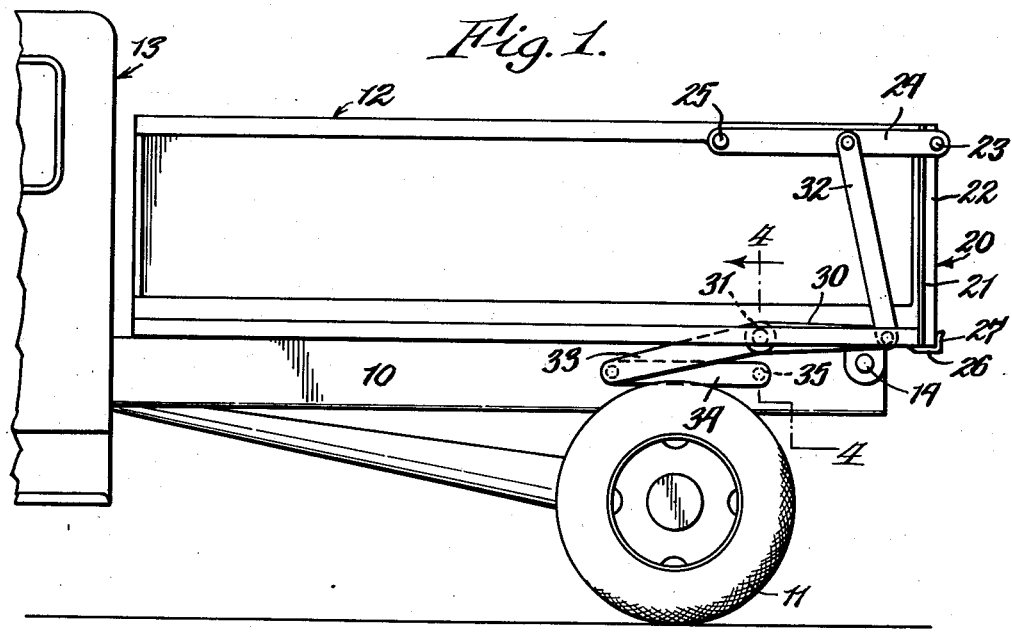
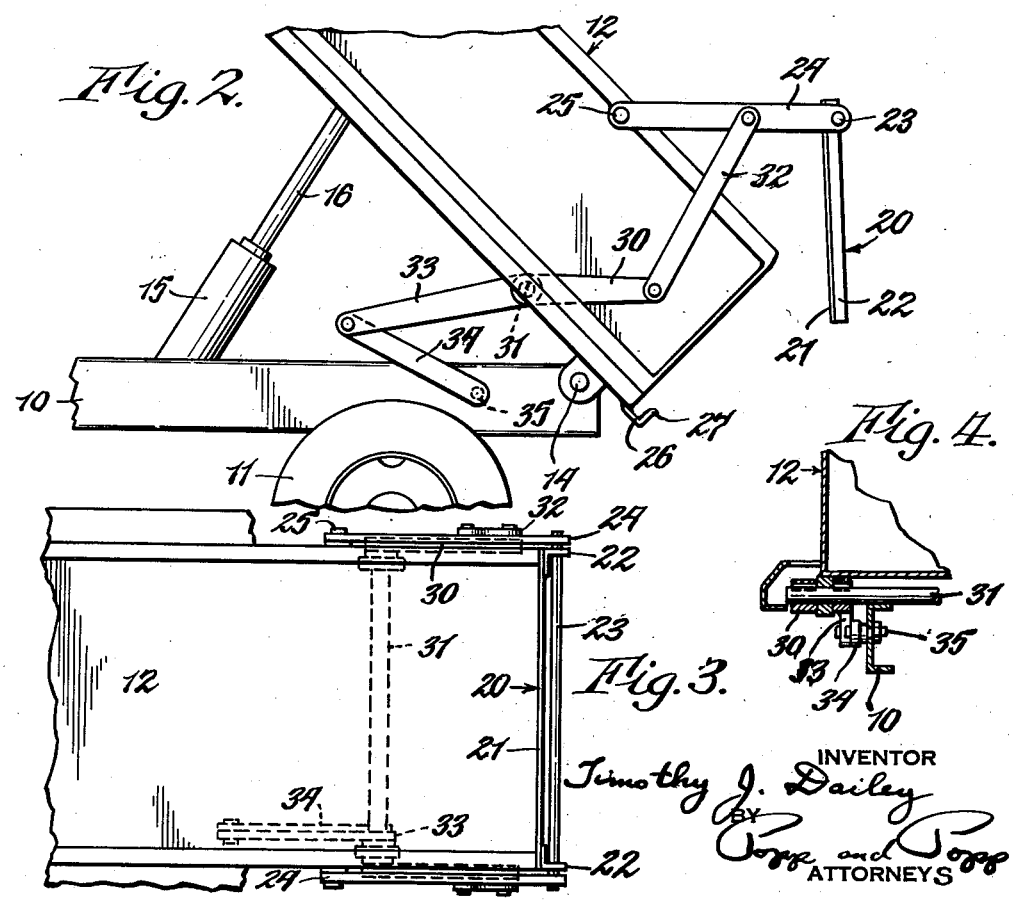
INVENTOR
Timothy J. Dailey
BY
Popp and Popp
ATTORNEYS Patented Sept. 3, 1940

2,213,385

UNITED STATES PATENT OFFICE 2,213,385

TAIL GATE OPERATING MECHANISM FOR DUMP TRUCKS

Timothy J. Dailey, Rochester, N. Y.

Application December 27, 1938, Serial No. 247,868

4 Claims. (Cl. 298—23)

This invention relates to a tail gate operating mechanism for dump trucks and more particularly to such a mechanism which operates automatically to swing the tail gate to open and closed positions as the body is raised and lowered thereby to facilitate the discharge of materials from the dump truck and the restoring of the dump truck to its normal condition for again being filled.

One of the objects of the invention is to provide a simple and positive mechanism for automatically opening the tail gate when the dump truck body is raised for the purpose of discharging the materials therefrom and for automatically restoring the tail gate to a closed position as the body is lowered.

Another object of the invention is to provide such a mechanism in which the tail gate is at all times held close to the dump truck body so that there is no interference with surrounding structure and the materials can be discharged at any place desired.

Another purpose of the invention is to provide such an automatic tail gate operating mechanism in which the tail gate is automatically latched in its closed position by the dropping of the dump truck body, thereby to avoid the necessity of a special latching mechanism to insure against loss of goods in transit.

Another object of the invention is to provide such a mechanism in which the opened tail gate swings freely so that there is no danger of breaking any parts during the discharge of materials.

Another object of the invention is to provide such an automatic operating mechanism which is extremely low in cost and rugged in construction and at the same time nests in such a manner as not to interfere with any other parts of the truck.

In the accompanying drawing:

Fig. 1 is a fragmentary side elevation of a dump truck equipped with a tail gate operating mechanism made in accordance with my invention.

Fig. 2 is a fragmentary view similar to Fig. 1 showing the dump truck body in its elevated or dumping position and the tail gate automatically opened by the mechanism forming the subject of my invention.

Fig. 3 is a fragmentary top elevation of a dump truck body showing parts broken away to illustrate the tail gate operating mechanism.

Fig. 4 is a fragmentary vertical transverse section taken on line 4—4, Fig. 1.

The dump truck to which my invention can be applied can be of any usual and well known construction, the dump truck illustrated in the accompanying drawing being of a conventional type and having longitudinal chassis bars 10 supported by wheels 11 and carrying the usual dump body 12 and cab 13. The dump body 12 is shown as being pivoted to the chassis bars 10 at 14 so that the body can be swung from the horizontal position illustrated in Fig. 1 to the inclined position illustrated in Fig. 2, the materials within the dump body sliding out the rear open end of the body when it is elevated to the position shown in Fig. 2. Any usual and well known mechanism can be employed for lifting the dump body 12 and restoring it to a horizontal position, that shown comprising a cylinder 15 carried by the chassis and housing a piston (not shown) of a piston rod 16 which piston rod is in turn connected with the dump body. Upon the admission of a fluid under pressure into the cylinder 15 the piston is driven outwardly, thereby to lift the dump body to the position shown in Fig. 2. Upon release of this fluid pressure the dump body returns by gravity to its horizontal position, the cylinder and piston rod swinging into a nested position under the body as it returns to such horizontal position.

The tail gate 20 can be of any suitable construction and is shown as composed of a sheet metal plate 21 reenforced at its sides by vertical angle irons 22. The tail gate is hung upon a horizontal rod 23 which passes through the upper ends of the angle irons 22, as best shown in Fig. 3. Each end of the rod 23 is in turn supported at the rear end of an arm 24, each arm 24 being pivoted to the corresponding side of the dump truck body 12, as indicated at 25. The opening and closing of the tail gate is effected by moving the arms 24 upwardly and downwardly as the dump truck is raised and lowered.

When the body is brought to a horizontal position and the arms 24 lowered, the lower end of the tail gate can be caught by any suitable form of latching device. The latching device illustrated is shown as comprising one or more brackets 26 secured to the rear end of the dump body 12 and having an upturned portion 27 which catches the lower end of the tail gate as it descends.

The tail gate is mounted on the rod 23 for free swinging movement and hence assumes a vertical position as it is raised and lowered. It will therefore be seen that as the tail gate and dump body are lowered, the lower edge of the tail gate will automatically be caught by the brackets 26 and it will further be seen that the start and discharge of materials from the dump body will occur as soon as the tail gate is lifted free from the brackets 26, since the pressure of the materials within the body will swing the tail gate rearwardly as soon as this release occurs. It will also be noted that since the tail gate assumes a vertical position it is constrained to follow a path which hugs the rear end of the dump body so as to avoid possible interference with surrounding structure.

The mechanism for automatically raising the arms 24 as the dump body 12 is raised is shown as comprising a pair of rock arms 30 which are keyed to a rock shaft 31, this rock shaft being arranged under the dump body 12 and being journaled to the dump body in any suitable manner. The outer end of each of the rock arms 30 is connected by a link 32 with the central part of the corresponding arm 24. The rock shaft 31 is operated by a rock arm 33 which extends forwardly from the rock shaft 31 and is secured thereto in any suitable manner. The free or forward end of the operating rock lever 33 is connected to the adjacent chassis frame bar 10 by a link 34, the pivotal connection between this link and chassis frame bar being indicated at 35.

It will be seen that as the dump body 12 is raised, the rock shaft 31 is moved away from the pivot 35 and hence the rock arm 33 is swung downwardly away from the dump body as it rises. This effects a corresponding movement of the rock shaft 31 which in turn swings the pair of rock arms 30 upwardly. This upward movement of the rock arms 30 raises the links 32 which in turn raise the arms 24 so as to swing the tail gate 20 from the latched position shown in Fig. 1 to the open position shown in Fig. 2. After the materials have been dumped from the dump body 12 the lowering of the dump body effects a reverse movement of the rock levers and links so that the tail gate is returned to the position shown in Fig. 1 and is automatically caught by the brackets 26.

From the foregoing it will be seen that the present invention provides a very simple and rugged mechanism for automatically swinging the tail gate of a dump truck to open and closed positions as the dump body is raised and lowered. It will also be seen that the tail gate is automatically latched when it assumes its closed position and is also constrained to move in such manner as not to interfere with surrounding structure. The system of levers and links shown also nest compactly when the dump body assumes its normal horizontal position and do not interfere with any of the other operating parts of the truck.

I claim as my invention:

1. The combination with a dump truck having a chassis, a dump body mounted thereon and means for raising said dump body about a fixed horizontal axis to discharge the contents thereof, of a tail gate at the discharge end of said body, a carrying member pivotally mounted at its front end on said body adjacent the rear end thereof, means pivotally connecting said tail gate to the rear end of said carrying member and permitting said tail gate to swing about a horizontal axis, and means interconnecting said carrying member, dump body and chassis for opening said tail gate through motion derived from the discharging movement of said dump body and for closing said tail gate through motion derived from the return movement of said dump body comprising a rock shaft mounted on said dump body, a rock lever fixed at one end thereof to said rock shaft, a link interconnecting the free end of said rock lever with said carrying member at a point intermediate the ends thereof, a second rock lever fixed to said rock shaft and a second link interconnecting said second rock lever with said chassis.

2. The combination with a dump truck having a chassis, a dump body mounted thereon and means for moving said dump body on a horizontal axis to discharge the contents thereof, of a tail gate at the discharge end of said body, a pair of arms pivotally secured to opposite sides of said dump body near the rear end thereof, means pivotally supporting the tail gate on the rear ends of said arms whereby said tail gate is free to swing around a horizontal axis, a rock shaft journaled on said body at the bottom thereof, a pair of rock arms fixed to said rock shaft and extending rearwardly therefrom, a link connecting the rear end of each of said rock arms with an intermediate portion of the corresponding tail gate carrying arm, a third rock arm fast to said rock shaft and extending forwardly therefrom and a link connecting the free forward end of said last rock arm with an adjacent part of said chassis.

3. The combination with a dump truck having a chassis, a dump body mounted thereon and means for raising said dump body about a fixed horizontal axis to discharge the contents thereof, of a tail gate at the discharge end of said body, a carrying member pivotally mounted at its front end on said body adjacent the rear end thereof, means pivotally connecting said tail gate to the rear end of said carrying member and permitting said tail gate to swing about a horizontal axis, means interconnecting said carrying member, dump body and chassis for opening said tail gate through motion derived from the discharging movement of said dump body and for closing said tail gate through motion derived from the return movement of said dump body comprising a rock shaft mounted on said dump body, a rock lever fixed at one end thereof to said rock shaft, a link interconnecting the free end of said rock lever with said carrying member at a point intermediate the ends thereof, a second rock lever fixed to said rock shaft and a second link interconnecting said second rock lever with said chassis, and means for latching said tail gate to said body during the last part of the closing movement of said tail gate.

4. The combination with a dump truck having a chassis, a dump body mounted thereon and means for moving said dump body on a horizontal axis to discharge the contents thereof, of a tail gate at the discharge end of said body, a pair of arms pivotally secured to opposite sides of said dump body near the rear end thereof, means pivotally supporting the tail gate on the rear ends of said arms whereby said tail gate is free to swing around a horizontal axis, a rock shaft journaled on said body at the bottom thereof, a pair of rock arms fixed to said rock shaft and extending rearwardly therefrom, a link connecting the rear end of each of said rock arms with an intermediate portion of the corresponding tail gate carrying arm, a third rock arm fast to said rock shaft and extending forwardly therefrom, a link connecting the free forward end of said last rock arm with an adjacent part of said chassis, and means for latching said tail gate to said body during the last part of the closing movement of said tail gate.

TIMOTHY J. DAILEY.